United States Patent
Kariya (10) Patent No.: US 10,023,126 B2
(45) Date of Patent: Jul. 17, 2018

(54) VEHICULAR STORAGE UNIT

(71) Applicant: TOYOTA JIDOSHA KABUSHIKI KAISHA, Toyota-shi, Aichi-ken (JP)

(72) Inventor: Yuji Kariya, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 9 days.

(21) Appl. No.: 15/208,156

(22) Filed: Jul. 12, 2016

(65) Prior Publication Data

US 2017/0072861 A1    Mar. 16, 2017

(30) Foreign Application Priority Data

Sep. 11, 2015  (JP) .................. 2015-179950

(51) Int. Cl.
 B60R 7/04  (2006.01)
(52) U.S. Cl.
 CPC ..................... B60R 7/04 (2013.01)
(58) Field of Classification Search
 CPC .................. B60R 7/04; B60R 7/005
 See application file for complete search history.

(56) References Cited

U.S. PATENT DOCUMENTS

| 5,752,740 A | 5/1998 | Volkmann et al. |
| 9,487,241 B2 * | 11/2016 | Iriguchi ................. B60K 37/06 |
| 2015/0353142 A1 | 12/2015 | Iriguchi et al. |

FOREIGN PATENT DOCUMENTS

| JP | H07-172366 A | 7/1995 |
| JP | H08-192685 A | 7/1996 |
| JP | 2013-028240 A | 2/2013 |
| JP | 2015-096347 A | 5/2015 |

* cited by examiner

Primary Examiner — D Glenn Dayoan
Assistant Examiner — Melissa A Black
(74) Attorney, Agent, or Firm — Oliff PLC (57) ABSTRACT

A vehicular storage unit that includes: an elongated shaped storage unit main body that is formed with an opening open toward a vehicle cabin inner side; and a lid that is provided at the vehicle cabin inner side of the opening, and that is supported by the storage unit main body so as to be capable of moving along a length direction of the storage unit main body. An opening width of the opening increases from a specific position on progression from one side toward another side of the storage unit main body in a length direction, and a width of the lid is increased so as to follow the opening width of the opening.

5 Claims, 6 Drawing Sheets

VEHICULAR STORAGE UNIT

CROSS-REFERENCE TO RELATED APPLICATION

This application is based on and claims priority under 35 USC 119 from Japanese Patent Application No. 2015-179950 filed on Sep. 11, 2015, which is incorporated by reference herein.

BACKGROUND

Technical Field

The present invention relates to a vehicular storage unit.

Related Art

Japanese Patent Application Laid-Open (JP-A) No. 2013-28240 describes a vehicular storage unit. Specifically, the vehicular storage unit includes a box that is disposed between a driving seat and a front passenger seat and includes an opening at an upper face thereof, and a lid that opens or closes the opening of the box. Plural hinges that are thin along the vehicle width direction are formed to the lid at spacings along the vehicle front-rear direction. The lid is thereby capable of elastic deformation along the vehicle front-rear direction. Plural slide shafts project out toward the vehicle width direction outsides at either vehicle width direction end portion of the lid, and the slide shafts are inserted into guide grooves extending along the vehicle front-rear direction in the opening of the box, thereby enabling the lid to slide along the guide grooves. Namely, the opening of the box is opened or closed by sliding the lid along the vehicle front-rear direction.

SUMMARY

However, in the configuration described in JP-A No. 2013-28240, the lid is formed in a substantially rectangular shape with its length direction along the vehicle front-rear direction in vehicle plan view. Namely, the vehicle width direction dimension of the lid is uniform. The slide shafts projecting out at either vehicle width direction end portion of the lid slide along the guide grooves formed to the box, such that, when configuration is such that the opening width of the opening increases from a specific position, gaps occur between the lid and the opening when the lid is made to slid along the guide grooves, which is detrimental to the external styling appearance. The shape of the lid and the shape of the opening that is opened or closed by the lid need to be shapes that have a uniform vehicle width direction dimension, such that the degrees of freedom for the shape of the lid and the opening, and thereby the vehicular storage unit, are limited. There is accordingly room for improvement of the background art regarding this point.

In consideration of the above circumstances, an object of the present invention is to increase the degrees of freedom for the shape of a vehicular storage unit.

Solution to Problem

A vehicular storage unit of a first aspect includes an elongated shaped storage unit main body that is formed with an opening open toward a vehicle cabin inside, and a lid that is provided at the vehicle cabin inside of the opening, and that is supported by the storage unit main body so as to be capable of moving along a length direction of the storage unit main body. An opening width of the opening increases from a specific position on progression from one length direction side toward another length direction side of the storage unit main body, and a width direction dimension of the lid is increased so as to follow the opening width of the opening.

In the first aspect, the opening width of the opening provided to the storage unit main body increases from the specific position on progression from the one length direction side toward the other length direction side of the storage unit main body. The width direction dimension of the lid provided at the vehicle cabin inside of the opening increases so as to follow the opening width of the opening. Gaps are thereby suppressed from occurring between the lid and the opening when the lid has been moved along the length direction of the storage unit main body. Namely, even in configurations in which the opening width of the opening changes, the occurrence of gaps between the lid and the opening, which is detrimental to the external styling appearance, can be suppressed. This accordingly enables the opening width of the opening, and therefore the width direction dimension of the vehicular storage unit, to be freely set to suit peripheral components.

A vehicular storage unit of a second aspect is the first aspect configured as follows. Rail sections that extend along the length direction of the storage unit main body are respectively formed to a pair of side walls that are disposed in a direction orthogonal to the length direction of the storage unit main body so as to face each other on either side across the opening. The lid includes a styling section configuring a styling face, and a width changing mechanism provided to the storage unit main body. The width changing mechanism includes: plural base members that are disposed inside the opening and are provided at spacings along the length direction of the storage unit main body; a left and right pair of slide members that are attached to the base member and that each have one end portion projecting out from the base member toward the side wall and inserted inside the rail section so as to be capable of moving in the opening width direction of the opening so as to follow the rail section; a left and right pair of first supporting members that are each formed with a circular arc portion in a position facing at least the side wall as viewed along the length direction of the storage unit main body, and that are supported so as to be capable of pivoting in the opening width direction of the opening by the slide members, wherein a terminal portion of the styling section in the opening width direction of the opening is attached to the circular arc portion; a left and right pair of first coupling members that extend with a length direction along substantially the opening width direction of the opening, and that each have one end portion in the length direction joined to the slide member; a left and right pair of second supporting members that are each supported so as to be capable of pivoting in the opening width direction of the opening by another length direction end portion of the first coupling member, that are interlocked with the first supporting members, and that pivot in the opposite direction to the first supporting members; and a left and right pair of second coupling members that are each formed in an elongated shape, and that each have one end portion supported by the base member and another end portion that causes the second supporting member to pivot in the opening width direction of the opening due to being attached to the second supporting member further toward a vehicle lower side than a pivot center of the second supporting member.

In the second aspect, the width changing mechanism is provided to the lid. Slide members that project out toward the side walls are attached to the base member of the width changing mechanism. Each slide member has an end portion inserted inside the respective rail section, and is capable of moving along the opening width direction of the opening so as to follow the rail section. The pair of rail sections are formed to the side walls that are disposed facing each other on either side across the opening, such that the rail sections extend so as to separate from each other along the opening width direction of the opening. Thus, when the lid is moved along the length direction of the storage unit main body in the direction in which the opening width of the opening increases, the slide members move toward the opening width direction outsides of the opening, and the first supporting members that are supported by the slide members also move toward the opening width direction outsides of the opening when this occurs. At the same time, the second supporting members that are supported by the slide members through the first coupling members also move toward the vehicle width direction outsides of the opening. When this occurs, since the second coupling members are attached to the respective second supporting members further toward the vehicle lower side than the pivot centers of the second supporting members, the second supporting members pivot from the opening upper side toward the opening width direction outsides as viewed along the length direction of the storage unit main body. The first supporting members, which are interlocked so as to pivot in the opposite direction to the respective second supporting members, pivot from the opening upper side toward the lid width direction inside. This pivoting of the first supporting members enables the width direction dimension of the lid to be increased, while stretching the styling section, attached to the circular arc portions of the first supporting members, along the lid width direction. This enables gaps to be suppressed from occurring between the opening and the lid at the location where the opening increases in the opening width direction.

When the lid is moved along the length direction of the storage unit main body in the direction in which the opening width of the opening decreases, the slide members move toward the opening width direction inside of the opening so as to follow the opening width of the opening, and the first supporting members that are supported by the slide members also move toward the opening width direction inside of the opening when this occurs. At the same time, the second supporting members that are supported by the slide members through the first coupling members also move toward the vehicle width direction inside of the opening. When this occurs, since the second coupling members are attached to the respective second supporting members further toward the vehicle lower side than the pivot centers of the second supporting members, the second supporting members pivot from the opening upper side toward the lid width direction inside as viewed along the length direction of the storage unit main body. The first supporting members, which are interlocked so as to pivot in the opposite direction to the respective second supporting members, pivot from the opening upper side toward the lid width direction outsides. This pivoting of the first supporting members enables the width direction dimension of the lid to be decreased, while the styling section, attached to the circular arc portions of the first supporting members, is wound onto an inner portion of the lid, and compressed along the lid width direction. This suppresses the lid from becoming unable to slide at the location of the opening where the opening width decreases. This enables the width direction dimension of the lid to be made to follow the spacing between the pair of rail sections provided to the opening, thereby enabling the opening width of the opening, and therefore the vehicle width direction dimension of the vehicular storage unit to be freely set to suit peripheral components.

DESCRIPTION OF EMBODIMENTS

First Exemplary Embodiment

Figure 1:
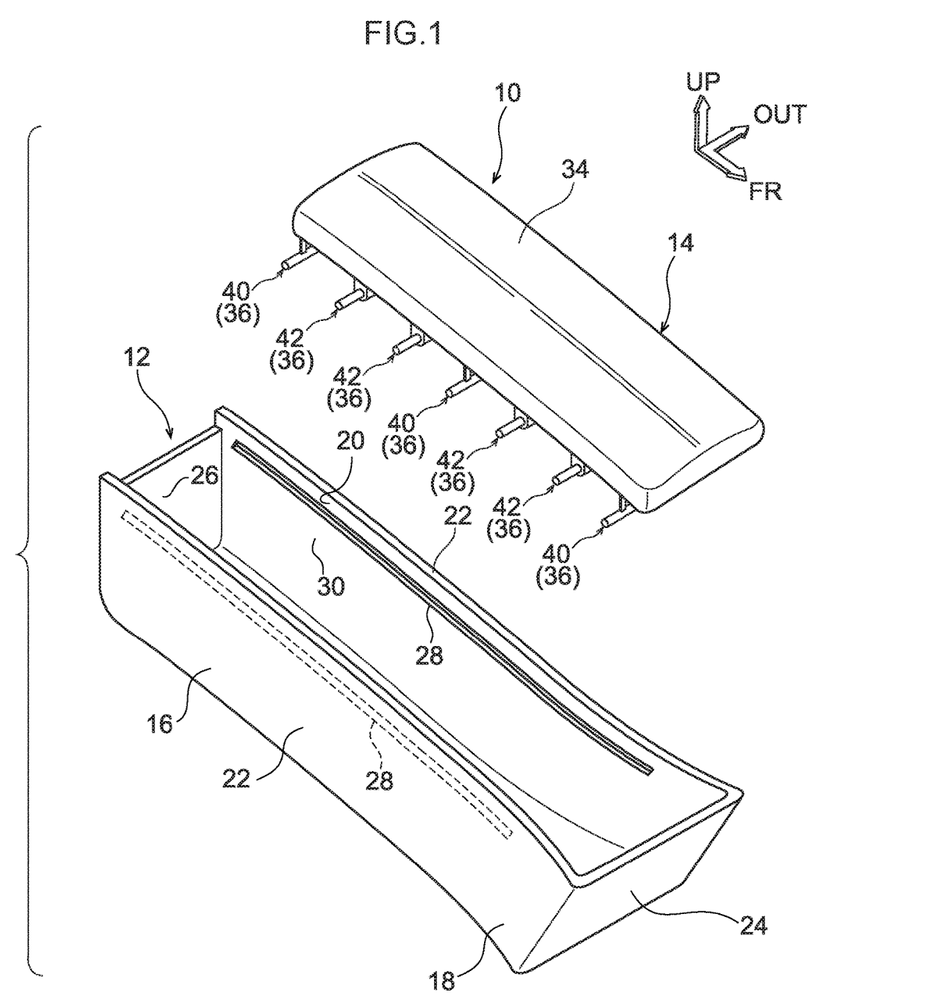
FIG. 1 is an exploded perspective view illustrating a vehicular storage unit according to a first exemplary embodiment.
Figure 2A:
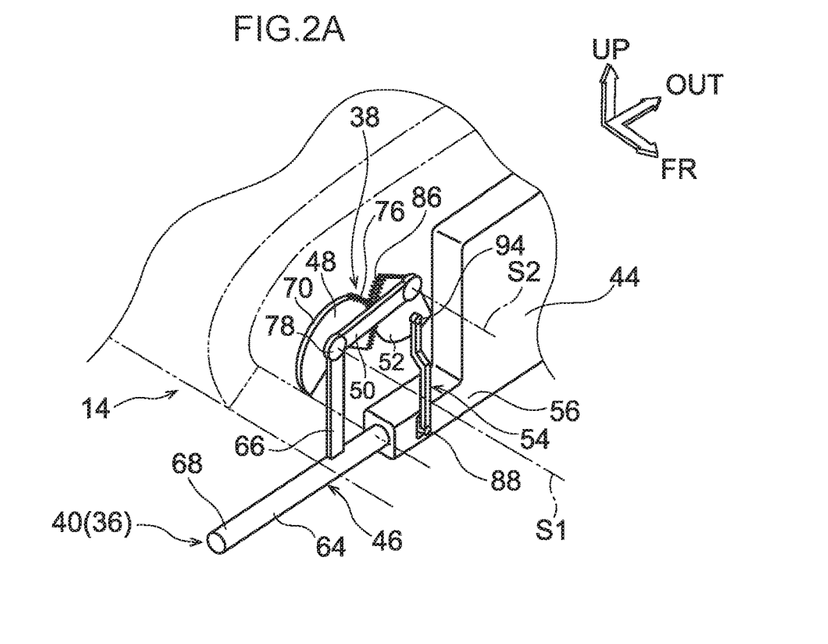
FIG. 2A is a schematic perspective view illustrating a first base section of a vehicular storage unit according to the first exemplary embodiment.
Figure 2B:
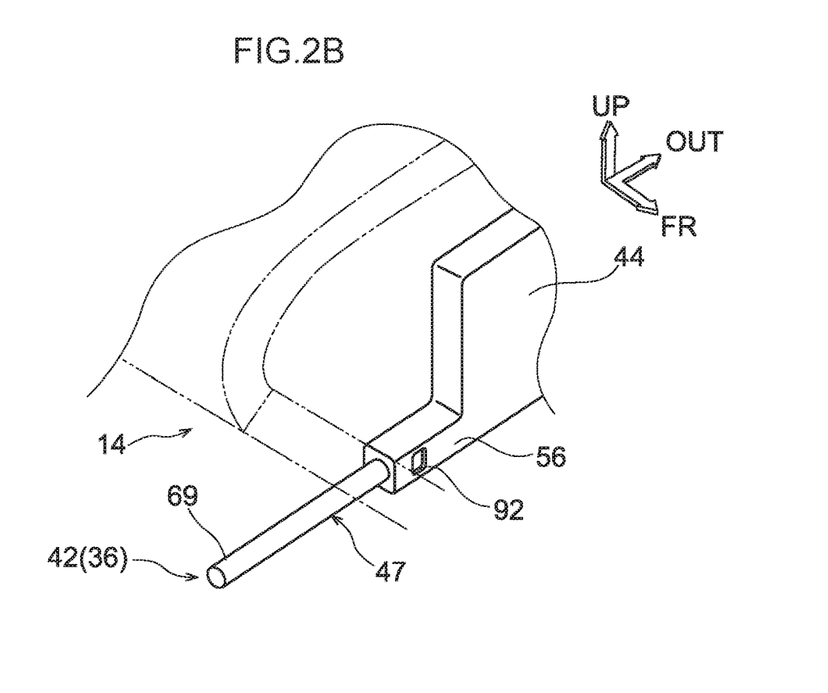
FIG. 2B is a schematic perspective view illustrating a second base section of a vehicular storage unit according to the first exemplary embodiment.
Figure 3A:
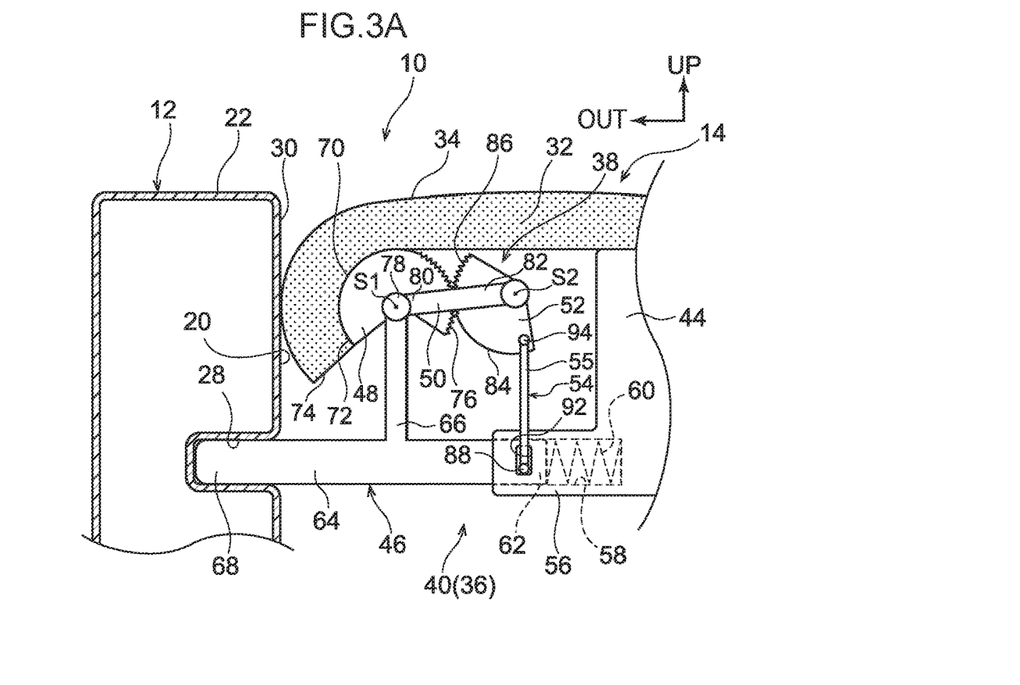
FIG. 3A is a cross-section illustrating relevant portions of a vehicular storage unit according to the first exemplary embodiment.
Figure 3B:
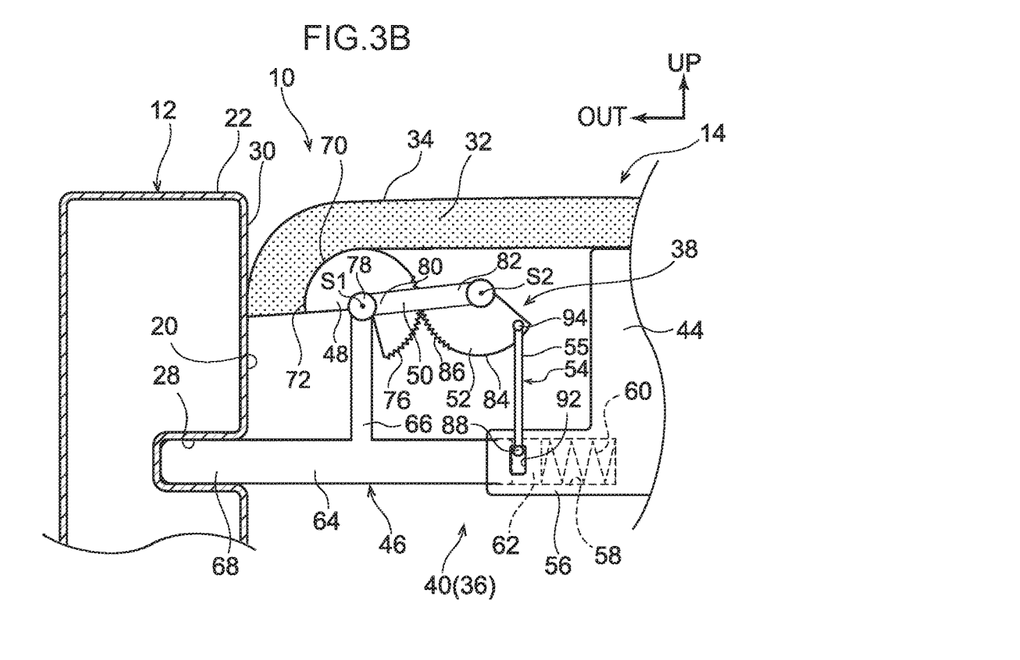
FIG. 3B is a cross-section illustrating a slide member in an extended state.

Explanation follows regarding an exemplary embodiment of a vehicular storage unit according to the present disclosure, with reference to FIGS. 1 to 3. Note that in each of the drawings, the arrow FR indicates the vehicle front-rear direction front side, the arrow OUT indicates the vehicle width direction outside, and the arrow UP indicates the vehicle up-down direction upper side.

As illustrated in FIG. 1, a vehicular storage unit 10 includes a storage unit main body 12, and a lid 14. The storage unit main body 12 is formed in an elongated box shape with its length direction along the vehicle front-rear direction. The storage unit main body 12 is disposed between a driving seat and a front passenger seat, and is configured by a general section 16 with a vehicle width direction dimension that is set to suit the location of the narrowest spacing between the driving seat and the front passenger seat, and a widened section 18 that is disposed further toward the vehicle front side than respective front end portions of the driving seat and the front passenger seat, and that has a vehicle width direction dimension that is enlarged toward the vehicle width direction outsides with respect to the general section 16. Namely, in vehicle plan view, the storage unit main body 12 has a vehicle width direction dimension that increases on progression from the respective front end portions of the driving seat and the front passenger seat, serving as a specific position, toward the vehicle front side.

An opening 20 is formed in the storage unit main body 12. The opening 20 is open toward the inside of a vehicle cabin, specifically, toward the vehicle upper side, and is formed by a pair of side walls 22 serving as side walls disposed at the vehicle width direction outsides of the storage unit main body 12, a front wall section 24 disposed at the vehicle front side, and a rear wall section 26 disposed at the vehicle rear side. Note that the opening 20 is formed with its length direction running along the storage unit main body 12 in the vehicle front-rear direction, and has its opening width in the vehicle width direction.

A rail section 28 is formed to each of the pair of side walls 22 of the storage unit main body 12. Each rail section 28 extends along substantially the vehicle front-rear direction at the vehicle upper side of a side face 30 at the vehicle width direction inside of the respective side wall 22, and has a cross-section profile orthogonal to its extension direction formed in a shape recessed toward the vehicle width direction outside (see FIGS. 3A, 3B). Note that the rail section 28 is similarly formed to the facing side wall 22. Namely, the rail sections 28 are formed facing each other. Note that the extension direction of the rail sections 28 is not necessarily along the vehicle front-rear direction, and may be slightly offset therefrom.

The lid 14 is formed in a substantially rectangular shape in vehicle plan view, and has a length direction dimension that is set shorter than a length direction dimension of the opening 20. The lid 14 includes a soft pad section 32 (see FIG. 3A) and a covering material 34 serving as a styling section, and base sections 36. The soft pad section 32 is formed in a substantially rectangular shape with its length direction along the vehicle front-rear direction in vehicle plan view, and, as an example, is configured of urethane foam. The soft pad section 32 is configured covered by the covering material 34.

Plural of the base sections 36 are formed at substantially uniform spacings along the vehicle front-rear direction at the vehicle lower side of the soft pad section 32. Namely, since one of the base sections 36 and another of the base sections 36 are separated from each other, the lid 14 is capable of elastic deformation along the vehicle front-rear direction.

The base sections 36 are configured by first base sections 40 each provided with a width changing mechanism 38, as illustrated in FIG. 2A, and second base sections 42 that are not provided with a width changing mechanism 38, as illustrated in FIG. 2B. As illustrated in FIGS. 3A and 3B, each width changing mechanism 38 is configured including a base member 44, a slide member 46, a first supporting member 48, a first coupling member 50, a second supporting member 52, and a second coupling member 54.

The base member 44 is formed in a substantially rectangular plate shape with a vehicle width direction dimension of a size that is set smaller than the opening width of the opening 20, and is disposed inside the opening 20. Base extension sections 56 are respectively formed extending toward the vehicle width direction outsides at the vehicle lower side of either vehicle width direction outside end portion of the base member 44. Note that leading end portions of the base extension sections 56 are separated from the respective side walls 22. A circular column shaped cavity 58 is formed with its axial direction along the vehicle width direction in an inside portion of each base extension section 56. A spring 60 with its expansion-contraction direction along the vehicle width direction, and a portion of the slide member 46, are inserted into an inner portion of the cavity 58. Specifically, the slide member 46 includes a slide shaft portion 64 (see FIG. 2A) formed in a circular column shape with its axial direction along the vehicle width direction and a support column portion 66, and an end portion 62 of the slide shaft portion 64 is inserted into the inner portion of the cavity 58. Namely, the slide member 46 projects out from the base member 44 toward the respective side wall 22. One end portion in the expansion-contraction direction of the spring 60 abuts a bottom wall portion of the cavity 58, and another end portion abuts the end portion 62 of the slide member 46. The slide member 46 is thereby biased by the biasing force of the spring 60 so as to move toward the vehicle width direction outside.

An end portion 68, serving as one length direction end portion of the slide shaft portion 64, is inserted inside the respective rail section 28 of the storage unit main body 12. The end portion 68 is thereby capable of moving along the vehicle front-rear direction while sliding inside the rail section 28. Namely, the slide member 46, and thereby the lid 14, is capable of moving with its slide direction along the vehicle front-rear direction. The end portion 62 at the opposite side of the slide shaft portion 64 to the end portion 68 is inserted inside the cavity 58 of the base member 44, and is retained inside the cavity 58 by a dislodgement prevention structure.

The support column portion 66 projects out toward the vehicle upper side from a substantially length direction center portion of the slide shaft portion 64. The support column portion 66 is integrally formed to the slide shaft portion 64.

The first supporting member 48 is formed in a substantially fan shape including a circular arc portion 70 in a position facing the respective side wall 22 in vehicle face-on view. A terminal portion 74 at the vehicle width direction outside of the soft pad section 32 is joined to an end portion 72 at the vehicle width direction outside of the circular arc portion 70. The soft pad section 32 is thereby wound toward the vehicle lower side about the circular arc portion 70. A first gear 76 is formed in a circular arc shape at the vehicle width direction inside of the circular arc portion 70 of the first supporting member 48. The first supporting member 48 is supported by a leading end portion 78 of the support column portion 66 of the slide member 46, and is capable of pivoting in the vehicle width direction about an axis 51 with its axial direction along the vehicle front-rear direction. Note that in the present exemplary embodiment, the first supporting member 48 is formed in substantially a fan shape in vehicle face-on view; however, configuration is not limited thereto, and the first supporting member 48 may be formed in another shape, such as a circular shape.

The first coupling member 50 is provided extending with its length direction along substantially the vehicle width direction, and one length direction end portion 80 is joined to the leading end portion 78 of the support column portion 66. The second supporting member 52 is attached to another end portion 82 at the opposite side to the one end portion 80 so as to be capable of pivoting in the vehicle width direction about an axis S2 with its axial direction along the vehicle front-rear direction.

The second supporting member 52 is formed in substantially a fan shape including a circular arc portion 84 in vehicle face-on view. A second gear 86 is formed running along the circular arc of the circular arc portion 84. The second gear 86 is configured so as to mesh with the first gear 76 of the first supporting member 48. Since the second supporting member 52 is capable of pivoting in the vehicle width direction about the axis S2, the first supporting member 48 and the second supporting member 52 pivot interlocked with each other. Note that the pivoting directions of the first supporting member 48 and the second supporting member 52 are the opposite pivoting directions to each other. In the present exemplary embodiment, the second supporting member 52 is formed in substantially a fan shape in vehicle face-on view; however, configuration is not limited thereto, and the second supporting member 52 may be formed in another shape, such as a circular shape.

In the present exemplary embodiment, the second coupling member 54 is configured divided into three components. Specifically, the second coupling member 54 is configured by an extension member 55 with its length direction extending along the vehicle up-down direction, a first shaft 88 serving as one end portion provided extending along the vehicle front-rear direction at a vehicle lower end of the extension member 55, and a second shaft 94 serving as another end portion provided extending along the vehicle front-rear direction at a vehicle upper end of the extension member 55. The first shaft 88 engages with an elongated hole portion 92 formed to the respective base extension section 56 of the base member 44. The elongated hole portion 92 is formed in a substantially rectangular shape with its length direction along the vehicle up-down direction in vehicle face-on view. The second coupling member 54 is accordingly capable of being displaced along the vehicle up-down direction.

The second shaft 94 at the opposite side of the second coupling member 54 to the first shaft 88 is attached to the second supporting member 52 with its axial direction along the vehicle front-rear direction so as to be capable of pivoting. Specifically, the second shaft 94 of the second coupling member 54 is attached further toward the vehicle lower side than the axis S2, this being the pivot center of the second supporting member 52. Note that in the present exemplary embodiment, the second coupling member 54 is configured divided into the three components, these being the extension member 55, the first shaft 88, and the second shaft 94; however, configuration is not limited thereto, and the second coupling member 54 may be configured as a single component by molding the three components together to form an integral unit.

As illustrated in FIG. 2B, each of the second base sections 42 provided to the lid 14 is configured by a base member 44, slide members 47, and springs 60. Each slide member 47 is formed in a circular column shape with its axial direction along the vehicle width direction, and has one length direction end portion 69 inserted inside the respective rail section 28 of the storage unit main body 12. The slide member 47 is accordingly capable of moving along the vehicle front-rear direction while sliding inside the rail section 28. The lid 14 is thereby capable of moving along the rail sections 28 in the vehicle front-rear direction at the vehicle upper side of the opening 20. Note that the lid 14 abuts the side walls 22 through the covering material 34 of the soft pad section 32, which corresponds to the circular arc portions 70 of each first supporting member 48 (see FIGS. 3A, 3B).

The spring 60 and the slide member 47 are inserted into an inner portion of a base extension section 56 of the base member 44 of the second base section 42. One end portion in the expansion-contraction direction of the spring 60 abuts the bottom wall portion of a cavity 58, and another end portion abuts an end portion of the slide member 47 at the opposite side to the end portion 69. The slide member 47 is accordingly biased by the biasing force of the spring 60 so as to move toward the vehicle width direction outside.

Operation and Advantageous Effects of First Exemplary Embodiment

Explanation follows regarding operation and advantageous effects of the present exemplary embodiment.

Figure 4A:
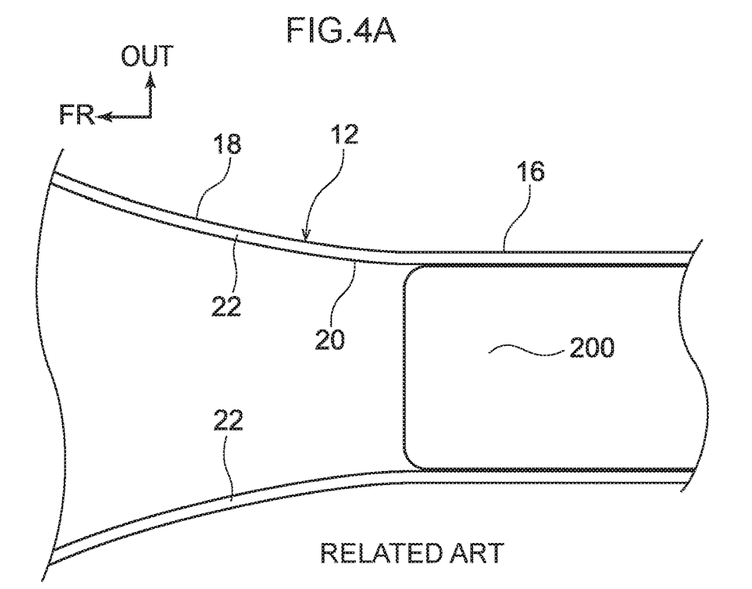
FIG. 4A is a plan view illustrating a vehicular storage unit according to a comparative example.
Figure 4B:
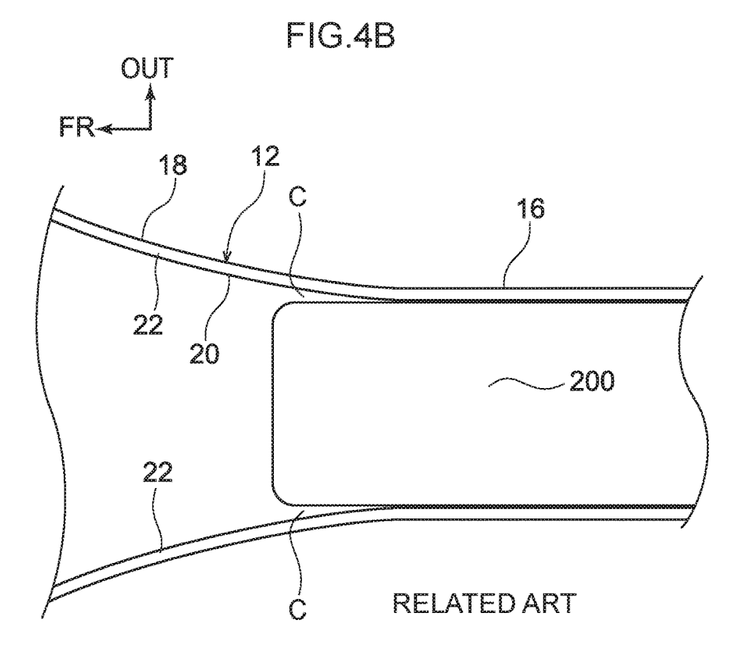
FIG. 4B is a plan view illustrating a lid that has been made to slide toward the vehicle front side.

Explanation follows regarding the operation and advantageous effects of the present exemplary embodiment with reference to a comparative example illustrated in FIGS. 4A and 4B. Note that similar configuration portions to those in the present exemplary embodiment are appended with the same reference numerals, and explanation thereof is omitted.

As illustrated in FIG. 4A, in vehicle plan view, the storage unit main body 12 has a vehicle width direction dimension that increases toward the vehicle width direction outsides on progression toward the vehicle front side. A lid 200 is attached, so as to be capable of moving along the vehicle front-rear direction, to the opening 20 provided at the inner portion of the storage unit main body 12. The lid 200 is formed in a substantially rectangular shape in vehicle plan view with its length direction along the vehicle front-rear direction and with substantially the same width direction dimension as the width direction dimension of the opening 20.

As illustrated in FIG. 4B, gaps C occur between the side walls 22 of the storage unit main body 12 and vehicle width direction end portions of the lid 200 when the lid section 200 is moved toward the vehicle front side. Namely, since the width direction dimension of the lid 200 is uniform, the lid 200 and the side walls 22 separate from each other when the lid 200 has been moved toward the vehicle front side. The gaps C thereby occur, and the quality of the external appearance is lowered. In order to avoid this, the shape of the lid 200 and the corresponding shape of the opening 20 to the lid 200 need to be shapes with uniform vehicle width direction dimensions, such that the degrees of freedom for the shapes of the lid 200 and the opening 20, and therefore the shape of the storage unit main body 12, are limited. In particular, in the comparative example, in cases of compact vehicles which have a narrow spacing between the driving seat and the front passenger seat, when an attempt is made to provide the vehicular storage unit 10 between the driving seat and the front passenger seat, the opening width of the opening 20 of the storage unit main body 12 and the width direction dimension of the lid 200 are set to suit the narrowest location in the vehicle width direction between the driving seat and the front passenger seat. These width direction dimensions are then set to be uniform along the vehicle front-rear direction of the vehicular storage unit. The opening 20 is thereby smaller and the storage capacity at the inner portion of the storage unit main body 12 is reduced. Thus it has not been practical to provide the vehicular storage unit 10 including the lid 200 between the driving seat and the front passenger seat in compact vehicles.

In contrast thereto, as illustrated in FIG. 1, the opening width of the opening 20 provided to the storage unit main body 12 in the present exemplary embodiment increases from the specific position on progression from the one length direction side of the storage unit main body 12 toward the other length direction side thereof. The width direction dimension of the lid 14 provided at the vehicle upper side of the opening 20 also increases so as to follow the opening width of the opening 20. Thus, the gaps C are suppressed from occurring between the lid 14 and the opening 20 (see FIG. 4B) when the lid 14 has been moved along the length direction of the storage unit main body 12. Namely, even in cases of a configuration in which the opening width of the opening 20 changes, the occurrence of the gaps C between the lid 14 and the opening 20, which is detrimental to the external styling appearance, can be suppressed. This accordingly enables the opening width of the opening 20, and therefore the width direction dimension of the vehicular storage unit 10, to be freely set to suit peripheral components.

The width changing mechanism 38 is provided to the lid 14. The slide members 46 that project out toward the side walls 22 are attached to the respective base members 44 of the width changing mechanism 38. Each slide member 46 has the end portion 68 inserted inside the rail section 28, and is capable of moving along the opening width direction of the opening 20 so as to follow the rail section 28. The pair of rail sections 28 are formed to the side walls 22 that are disposed facing each other on either side of the opening 20, such that the rail sections 28 each extend along the opening width direction of the opening 20 so as to separate from each other. Thus, when the lid 14 is moved along the length direction of the storage unit main body 12 in a direction in which the opening width of the opening 20 increases, as illustrated in FIG. 3B, each slide member 46 moves toward the opening width direction outside of the opening 20. When this occurs, the first supporting member 48 that is supported by the slide member 46 also moves toward the opening width direction outside of the opening 20. At the same time, the second supporting member 52 that is supported by the slide member 46 through the first coupling member 50 also moves toward the opening width direction outside of the opening 20. When this occurs, since the second coupling member 54 is attached to the second supporting member 52 further toward the vehicle lower side than the pivot center (axis S2) of the second supporting member 52, the second supporting member 52 is pivoted from the opening upper side toward the width direction outside of the lid 14 in length direction view of the storage unit main body 12. The first supporting member 48 that is interlocked with the second supporting member 52 so as to pivot in the opposite direction thereto is thereby pivoted from the opening upper side toward the width direction inside of the lid 14. This pivoting of the first supporting member 48 enables the width direction dimension of the lid 14 to be increased, while the covering material 34 and the soft pad section 32 that are attached to the circular arc portion 70 of the first supporting member 48 are stretched along the width direction of the lid 14. This enables the gaps C to be suppressed from occurring between the opening 20 and the lid 14 at locations where the opening 20 increases in the opening width direction.

When the lid 14 is moved along the length direction of the storage unit main body 12 in the direction in which the opening width of the opening 20 decreases, each slide member 46 moves toward the opening width direction inside of the opening 20 so as to follow the opening width of the opening 20. When this occurs, the first supporting member 48 that is supported by the slide member 46 also moves toward the opening width direction inside of the opening 20. At the same time, the second supporting member 52 that is supported by the slide member 46 through the first coupling member 50 also moves toward the opening width direction inside of the opening 20. When this occurs, since the second coupling member 54 is attached to the second supporting member 52 further toward the vehicle lower side than the pivot center (axis S2) of the second supporting member 52, the second supporting member 52 is pivoted from the opening upper side toward the width direction inside of the lid 14 in length direction view of the storage unit main body 12. The first supporting member 48 that is interlocked with the second supporting member 52 so as to pivot in the opposite direction thereto is thereby pivoted from the opening upper side toward the width direction outside of the lid 14. This pivoting of the first supporting member 48 enables the width direction dimension of the lid 14 to be decreased, while the covering material 34 and the soft pad section 32 that are attached to the circular arc portion 70 of the first supporting member 48 are wound onto the inner portion of the lid 14 and compressed along the width direction of the lid section 14. This suppresses the lid 14 from becoming unable to slide at locations where the opening width of the opening 20 decreases. This enables the width direction dimension of the lid 14 to be made to follow the spacing between the pair of rail sections 28 provided to the opening 20, thereby enabling the opening width of the opening 20, and therefore the width direction dimension of the vehicular storage unit 10, to be freely set to suit peripheral components. Namely, in cases in which the vehicular storage unit 10 is provided between the driving seat and the front passenger seat in compact vehicles, the storage volume of the inner portion of the storage unit main body 12 can be made a practical volume by setting a position that is not constrained by the driving seat or the front passenger seat as the specific position at which to enlarge the opening 20 in the vehicle width direction. This enables the vehicular storage unit 10 including the lid 14 to be provided between the driving seat and the front passenger seat in compact vehicles.

With regards to the covering material 34 and the soft pad section 32 of the lid 14, since the soft pad section 32 wound with the covering material 34 is provided at the vehicle upper side, the lid 14 may be utilized as an armrest by moving the lid 14 to a desired position in the vehicle front-rear direction. This enables the comfort of an occupant to be improved.

Second Exemplary Embodiment

Figure 5:
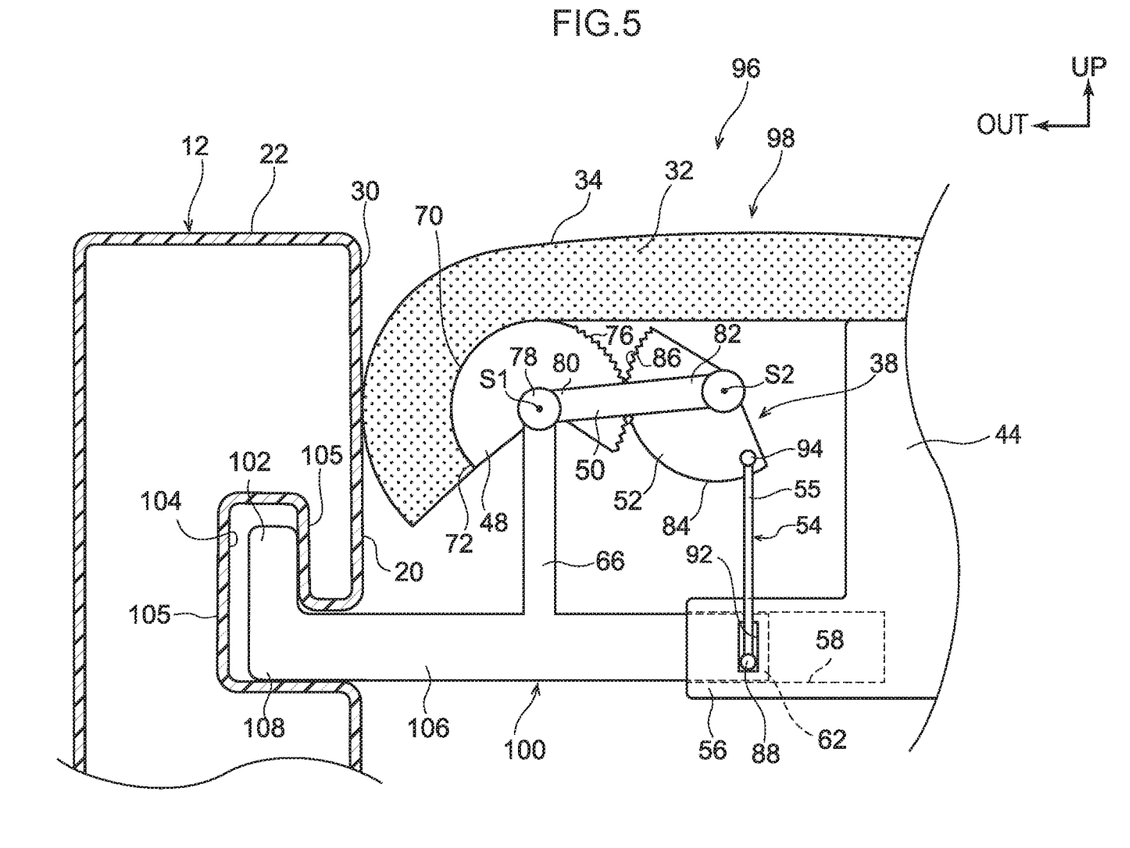
FIG. 5 is a cross-section illustrating relevant portions of a vehicular storage unit according to a second exemplary embodiment.

Explanation follows regarding a vehicular storage unit according to a second exemplary embodiment of the present invention, with reference to FIG. 5. Note that similar configuration portions to the first exemplary embodiment described above are appended with the same reference numerals, and explanation thereof is omitted.

As illustrated in FIG. 5, a vehicular storage unit 96 according to the second exemplary embodiment has basically the same configuration as that in the first exemplary embodiment, with the exception that a dependent section 102 is formed to each slide member 100 of a lid 98.

Namely, rail sections 104 are formed to the side walls 22 of the storage unit main body 12. The rail sections 104 extend along substantially the vehicle front-rear direction at the side faces 30 at the vehicle width direction inside of the side walls 22, and are each configured including a substantially L-shaped space formed by a pair of rail side walls 105 extending along the vehicle up-down direction in cross-section orthogonal to the extension direction of the rail sections 104. Note that the rail section 104 is similarly formed to the facing side wall 22. Namely, the rail sections 104 are formed facing each other in the vehicle width direction.

Each base member 44 is formed in a substantially rectangular plate shape in vehicle face-on view, and the base extension section 56 is formed extending toward the vehicle width direction outside at the vehicle lower side of either vehicle width direction outside end portion of the base member 44. The circular column shaped cavity 58 is formed with its axial direction along the vehicle width direction in the inner portion of the base extension section 56, and the slide member 100 is inserted into the inner portion of the cavity 58.

The slide member 100 is configured including a slide shaft section 106 and the support column section 66. The slide shaft section 106 extends with its length direction along the vehicle width direction, and the dependent section 102 is formed to one length direction end portion 108, serving as one end portion, of the slide shaft section 106. The dependent section 102 is disposed between the pair of rail side walls 105 and extends toward the vehicle upper side from the end portion 108 of the slide shaft section 106. The end portion 108 including the dependent section 102 is inserted inside the respective rail section 104 of the storage unit main body 12. The slide member 100 is thereby capable of moving along the vehicle front-rear direction inside the rail section 104 while causing the dependent section 102 to abut the rail side walls 105.

Operation and Advantageous Effects of Second Exemplary Embodiment

Explanation follows regarding operation and advantageous effects of the second exemplary embodiment.

The above configuration is configured similarly to the vehicular storage unit 10 of the first exemplary embodiment, with the exception that the dependent section 102 is formed to each slide member 100, such that similar advantageous effects to those in the first exemplary embodiment can be obtained. Namely, the gaps C (see FIG. 4B) can be suppressed from occurring between the lid 98 and the opening 20 when the lid 98 has been moved along the length direction of the storage unit main body 12. This accordingly enables the opening width of the opening 20, and therefore the width direction dimension of the vehicular storage unit 96, to be freely set to suit peripheral components.

The dependent section 102 is formed to each slide member 100, and the dependent section 102 abuts the rail side walls 105 inside the respective rail section 104 when the slide member 100 slides along the vehicle front-rear direction. Namely, in the storage unit main body 12 in which the pair of rail sections 104 extend so as to separate from each other in the vehicle width direction on progression toward the vehicle front side in vehicle plan view, the dependent section 102 abuts the rail side walls 105 inside the respective rail section 104, such that the dependent section 102, and therefore the slide member 100, moves along the vehicle width direction so as to follow the rail section 104. Namely, the slide members 100 can be made to follow the rail sections 104 using a simple configuration. This enables the width direction dimension of the lid 98 to be made to follow the opening width direction dimension of the opening 20, thereby enabling the opening width of the opening 20, and therefore the width direction dimension of the vehicular storage unit 96 to be freely set to suit peripheral components.

Third Exemplary Embodiment

Figure 6:
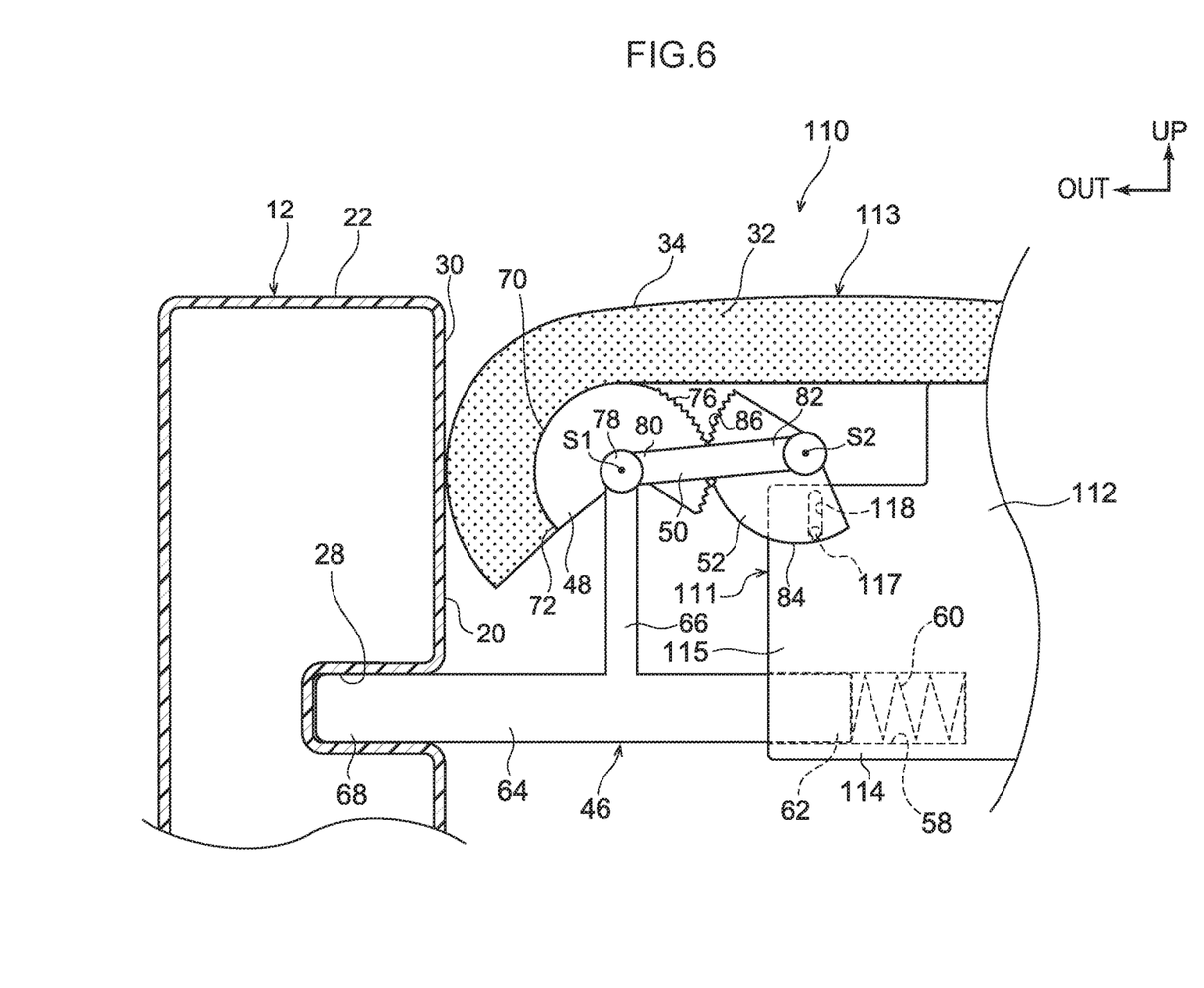
FIG. 6 is a cross-section illustrating relevant portions of a vehicular storage unit according to a third exemplary embodiment.

Explanation follows regarding a vehicular storage unit according to a third exemplary embodiment of the present invention, with reference to FIG. 6. Note that similar configuration portions to the first exemplary embodiment previously described are appended with the same reference numerals, and explanation thereof is omitted.

As illustrated in FIG. 6, a vehicular storage unit 110 according to the third exemplary embodiment has basically the same configuration as that in the first exemplary embodiment, with the exception that each second supporting member 52 of a lid 113 is attached to a base member 112 through a second coupling member 111 so as to be capable of pivoting.

Namely, the base member 112 is formed in a substantially rectangular plate shape with a vehicle width direction dimension of a size that is set smaller than the opening width of the opening 20, and is disposed inside the opening 20. A base extension section 114 is formed extending toward the vehicle width direction outside at the vehicle lower side of either vehicle width direction outside end portion of the base member 112. Note that a leading end portion of the base extension section 114 is separated from the respective side wall 22. The circular column shaped cavity 58 is formed with its axial direction along the vehicle width direction at an inner portion of each base extension section 114, and the spring 60 with its expansion-contraction direction along the vehicle width direction, and a portion of the slide member 46, are inserted into the inner portion of the cavity 58. The slide member 46 is accordingly biased by the biasing force of the spring 60 so as to move toward the vehicle width direction outside.

An extension section 115, serving as a portion of the second coupling member 111, described below, is provided at a vehicle upper side of the respective base extension section 114. The extension section 115 is provided as far as a position superimposed on a vehicle lower side portion of the second supporting member 52 in vehicle face-on view, and is integrally formed to the base extension section 114 and the base member 112.

The second supporting member 52 is attached to the other end portion 82 of the first coupling member 50 so as to be capable of pivoting about the axis S2, and the second coupling member 111 is attached to the second supporting member 52 further toward the vehicle lower side than the axis S2. The second coupling member 111 is configured divided into two components in the present exemplary embodiment. Specifically, the second coupling member 111 is configured by the extension section 115 and a shaft 117. The shaft 117 extends along the vehicle front-rear direction, and one length direction end portion thereof engages with an elongated hole portion 118 formed to the extension section 115. The elongated hole portion 118 is formed with its length direction along the vehicle up-down direction. Another length direction end portion of the shaft 117 is attached to the second supporting member 52 further toward the vehicle lower side than the axis S2 so as to be capable of pivoting. Note that the shaft 117 may be integrally formed to the second supporting member 52 further to the vehicle lower side than the axis S2.

Operation and Advantageous Effects of Third Exemplary Embodiment

Explanation follows regarding operation and advantageous effects of the third exemplary embodiment.

The above configuration is also configured similarly to the vehicular storage unit 10 of the first exemplary embodiment, with the exception that the second supporting member 52 is attached to the base member 112 by the second coupling member 111 so as to be capable of pivoting, such that similar advantageous effects to those in the first exemplary embodiment can be obtained. Namely, the gaps C (see FIG. 4 B) can be suppressed from occurring between the lid 113 and the opening 20 when the lid 113 has been moved along the length direction of the storage unit main body 12. This accordingly enables the opening width of the opening 20, and therefore the width direction dimension of the vehicular storage unit 110, to be freely set to suit peripheral components.

The second coupling member 111 is configured of two components, these being the extension section 115 and the shaft 117. Namely, the configuration of the second coupling member 111 can be simplified, thereby enabling the number of assembly processes to be reduced.

Note that in the present exemplary embodiment, the slide member 46 is biased by the biasing force of the spring 60 so as to move toward the vehicle width direction outside; however, configuration is not limited thereto. Each rail section 28 may be formed so as to include a substantially L-shaped space formed by a pair of rail side walls extending along the vehicle up-down direction in cross-section along the vehicle width direction, and a dependent section that is disposed at the inner portion of the rail section 28 and is capable of abutting the rail side walls may be configured provided to the end portion 68 of the slide member 46. This enables the slide member 46 to be made to follow the rail section 28 using a simple configuration.

In the first to third exemplary embodiments described above, the base sections 36 are configured by combining plural first base sections 40 each provided with the width changing mechanism 38, and plural second base sections 42 that are not provided with the width changing mechanism 38; however, configuration is not limited thereto, and the base sections 36 may be configured by only the first base sections 40.

In the first to third exemplary embodiments described above, the vehicular storage unit 10 configures what is referred to as a console provided between the driving seat and the front passenger seat; however, configuration is not limited thereto, and the vehicular storage unit 10 may be provided in another position, such as at the center of rear passenger seats.

In the first to third exemplary embodiments, the lid 14, 98, 113 is configured provided with the soft pad section 32 covered by the covering material 34 at the vehicle upper side; however, configuration is not limited thereto, and the lid 14, 98, 113 may be configured provided with another component such as a resin plate that is provided with a thinned portion and is capable of deforming along the vehicle width direction.

The lid 14, 98, 113 moves along the rail sections 28, 104 in the vehicle front-rear direction at the vehicle upper side of the opening 20; however, configuration is not limited thereto, and the opening 20 may be opened or closed by the lid 14, 98, 113. Specifically, configuration may be such that the rear side of each rail section is extended toward the vehicle lower side, and a length direction dimension of a lid is set to be the same as a length direction dimension of an opening, or greater. This enables the opening to be closed by moving the lid toward the vehicle front side, and enables the length direction dimension of the lid to be shortened in vehicle plan view and the opening to be opened by moving the lid toward the vehicle rear side and moving a rear end portion of the lid toward the vehicle lower side along the rail section. Note that the third exemplary embodiment may be applied not only to the first exemplary embodiment, but also to the second exemplary embodiment.

Exemplary embodiments of the present invention have been explained above; however, the present invention is not limited thereto, and various other modifications may be implemented within a range not departing from the spirit of the present invention.

The vehicular storage unit of the present disclosure enables the degrees of freedom for the shape of the vehicular storage unit to be increased.

The invention claimed is:

1. A vehicular storage unit comprising:
an elongated shaped storage unit main body that is formed with an opening open toward a vehicle cabin inner side of the storage unit main body; and
a lid that is provided at the vehicle cabin inner side of the opening, the lid being supported by the storage unit main body so as to move along a length direction of the storage unit main body, the lid including a styling section having a styling face, and a width changing mechanism provided at the storage unit main body, the width changing mechanism including a left and right pair of first supporting members each formed with a circular arc portion facing at least a corresponding side wall of the storage unit main body as viewed along the length direction of the storage unit main body, the left and right pair of first supporting members being configured to pivot in an opening width direction of the opening, which is transverse to the length direction of the storage unit main body, wherein:
a terminal portion of the styling section of the lid in the opening width direction of the opening is attached to each circular arc portion,
an opening width of the opening progressively increases from a specific position from a first end of the storage unit main body toward a second end of the storage unit main body in the length direction, and
a width of the lid progressively increases as the opening width of the opening increases in the length direction of the storage unit main body.

2. The vehicular storage unit of claim 1, wherein:
a plurality of rail sections that extend along the length direction of the storage unit main body are respectively formed at that side walls that are disposed in a direction orthogonal to the length direction of the storage unit main body so as to face each other on either side across the opening;
the width changing mechanism includes:
a plurality of base members that are disposed inside the opening and are provided at spacings along the length direction of the storage unit main body,
a left and right pair of slide members that are attached to the base members and that each have one end portion projecting out from one of the base members toward one of the side walls and inserted inside a corresponding rail section so as to move in the opening width direction of the opening so as to follow the corresponding rail section,
a left and right pair of first coupling members having a length direction that extends substantially along the opening width direction of the opening, and that each have one end portion in the length direction joined to a respective slide member,
a left and right pair of second supporting members that are each supported so as to pivot in the opening width direction of the opening by another length direction end portion of one of the first coupling members, the left and right pair of second supporting members being interlocked with the first supporting members, and the left and right pair of second supporting members pivot in an opposite direction from the first supporting members, and
a left and right pair of second coupling members that are each formed in an elongated shape, and that each have one end portion supported by one of the base members and another end portion that causes one of the second supporting members to pivot in the opening width direction of the opening due to being attached to the one of the second supporting members further toward a vehicle lower side than a pivot center of the one of the second supporting members.

3. The vehicular storage unit of claim 2, wherein:
a dependent section is disposed at one end portion of each slide member;
the dependent section is disposed between a pair of rail side walls;
the dependent section extends out toward a vehicle upper side from the one end portion of the slide member; and
the one end portion is inserted inside the rail section.

4. The vehicular storage unit of claim 2, wherein:
each second coupling member includes an extension member, a first shaft, and a second shaft;
the extension member extends with a length direction along a vehicle up-down direction;
the first shaft is provided at a vehicle up-down direction lower end of the extension member and extends along a vehicle front-rear direction;
the second shaft is provided at a vehicle up-down direction upper end of the extension member and extends along the vehicle front-rear direction;
the first shaft engages with an elongated hole portion included in the base extension section of the base member; and
the elongated hole portion has a rectangular shape with a length direction along the vehicle up-down direction in a vehicle face-on view.

5. The vehicular storage unit of claim 2, wherein:
each second coupling member includes an extension section and a shaft;
the shaft extends along a vehicle front-rear direction;
one end portion of the shaft engages with an elongated hole portion included in the extension section; and
the elongated hole portion has a shape with a length direction along a vehicle up-down direction.

\* \* \* \* \*